Sept. 16, 1952 W. C. HAMILTON 2,610,867

TELEPHONE MEMO PAD ASSEMBLY

Filed July 13, 1949 2 SHEETS—SHEET 1

Inventor

William C. Hamilton

By Clarence A. O'Brien and Harvey B. Jacobson

Attorneys

Sept. 16, 1952 W. C. HAMILTON 2,610,867

TELEPHONE MEMO PAD ASSEMBLY

Filed July 13, 1949 2 SHEETS—SHEET 2

Inventor

William C. Hamilton

By Clarence A. O'Brien and Harvey B. Jacobson

Attorneys

Patented Sept. 16, 1952 2,610,867

UNITED STATES PATENT OFFICE 2,610,867

TELEPHONE MEMO PAD ASSEMBLY

William C. Hamilton, Esther, Mo.

Application July 13, 1949, Serial No. 104,518

4 Claims. (Cl. 281—12)

This invention relates generally to attachments for telephones and more particularly to a memo pad assembly securable to a telephone receiver unit and adapted to provide replaceable sections of note paper for the convenience of a person using the telephone, in making notations relating to messages received on the telephone.

A primary object of this invention is to provide a telephone memo pad assembly suitable for mounting on the base of a telephone receiver unit so that the normal use of the unit will not be interfered with, and so that a ready source of supply of note paper will be at all times available, the device making provision for the easy shearing of the paper so that written notations may be easily destroyed or carried away as desired.

Another object of this invention is to provide a memo pad assembly for telephones, wherein provision is made against use of the device by careless persons in a manner making it difficult for the next user to employ the device to its fullest capacity. In other words, provision is made against accidental complete withdrawal of the paper from the main writing surface.

Still another object of this invention, ancillary to the preceding object, is to provide a device wherein the paper, fed from a roll of paper, is easily threaded through the frame and table of the device, when a new roll is necessarily placed in the device.

Another object of this invention is to provide a memo pad assembly which can be secured to conventional telephone receiver units without undue alteration thereof, and which may be secured to a wide variety of such receiver units, the term "receiver units" being used herein as connoting head sets and the like.

Still another object of this invention is to provide means wherein a slidable table has laterally disposed channel members to guide the paper and to hold the same while the user is writing thereon.

Another object is to provide a device such as that mentioned above with a writing table having a combined hand grip member and pencil holder of a novel and highly utilitarian character.

And the last object to be mentioned specifically is to provide a device of this character in a form wherein the individual units are each practicable and inexpensive to manufacture, wherein the assembly of the device and the adaptation thereof to slightly different telephone units is extremely simple, and which is extremely durable and sturdy so that a long period of service is insured.

With these objects definitely in view, this invention resides to certain novel features of construction, combination and arrangement of elements and portions as will be hereinafter described in detail in the specification, particularly pointed out in the appended claims, and illustrated in the accompanying drawings which form a material part of this application, and in which:

Similar characters of reference designate similar or identical parts and portions throughout the specification and throughout the different views of the drawings.

Figures 1, 2:
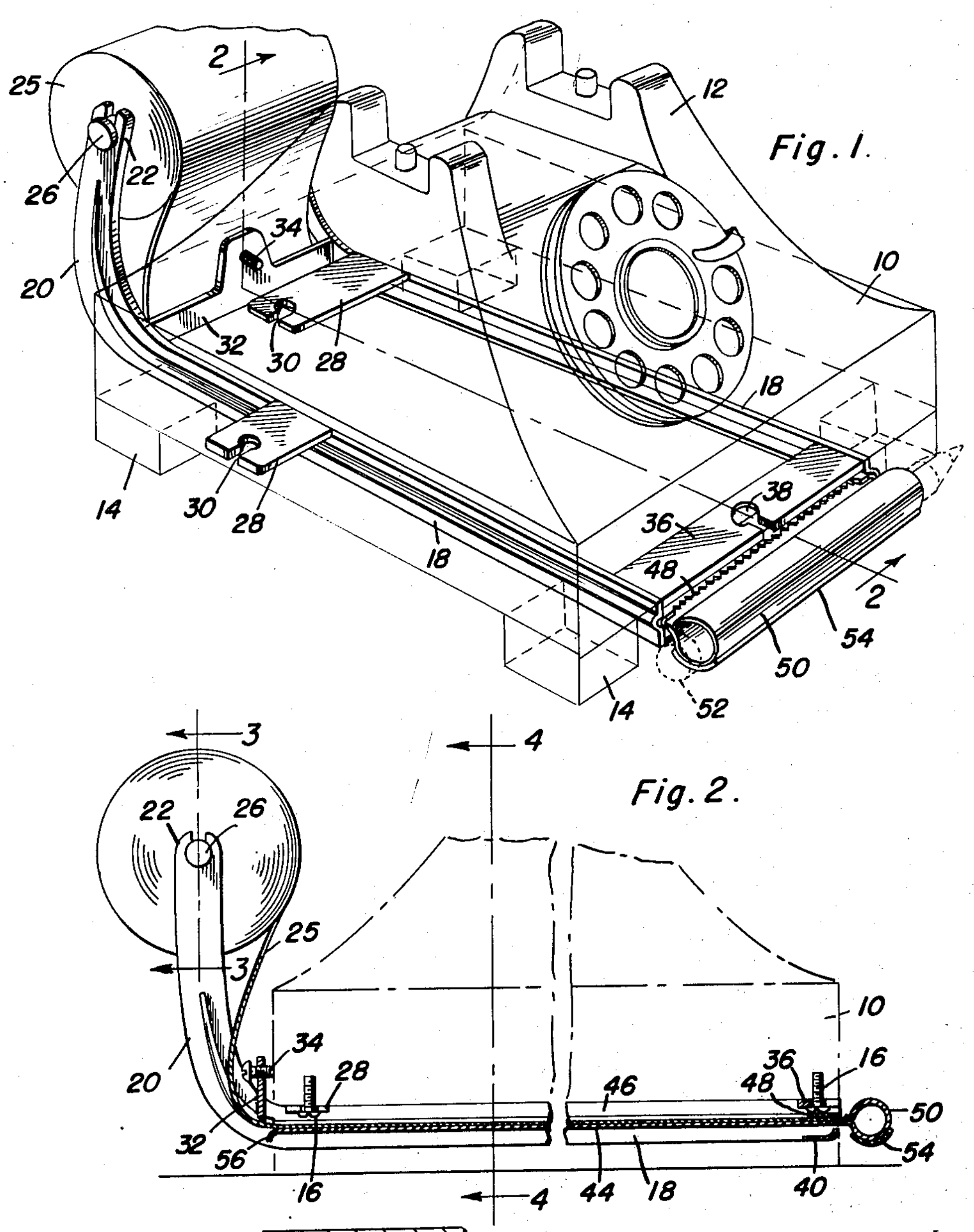
Figure 1 is a three dimensional view of this invention, a hand set being imposed in light lines upon the subject matter of this invention, in order to show the positional and functional relationship of the various elements concerned.
Figure 2 is a vertical sectional view, taken substantially upon the line 2—2 in Figure 1.
Figure 3:
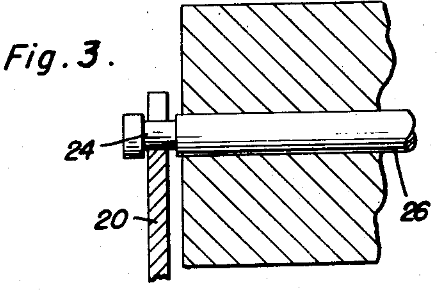
Figure 3 is a fragmentary vertical sectional view taken on the line 3—3 in Figure 2.
Figure 4:
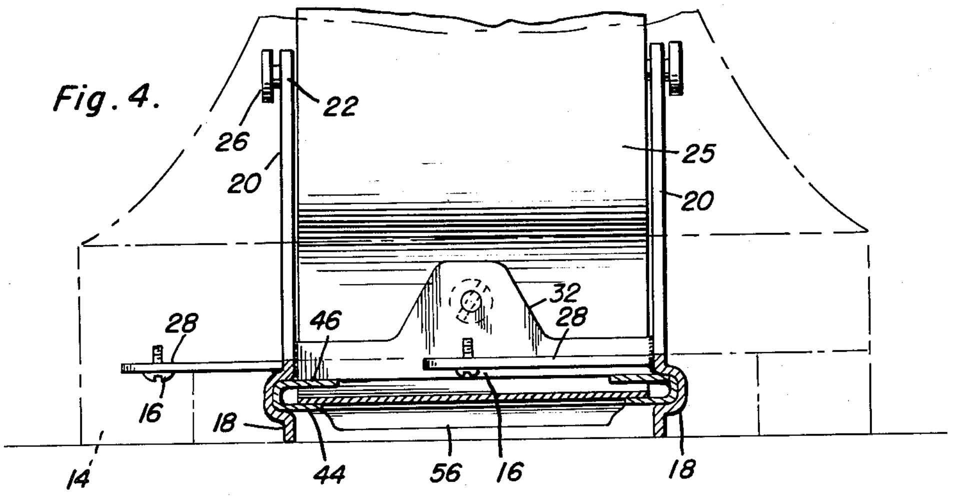
Figure 4 is a vertical sectional view taken substantially upon the line 4—4 in Figure 2.

Referring now to the drawings in detail, this invention comprises a part of a combination including a conventional telephone hand set 10 which will include a receiver cradle 12, resilient legs or cushion members 14, and the base of such a hand set ordinarily has a plurality of screws 16 on the undersurface thereof arranged according to a very definite pattern which will in a measure dictate the exact configuration of portions of the frame hereinafter described.

The above mentioned frame is comprised of a pair of laterally disposed guide rails 18 having confronting longitudinal grooves. These guide rails 18 extend beneath the base of the hand set 10 and each guide rail has an upwardly curved extending portion 20 terminating in simple slot bearings 22, these bearings receiving journal portions 24 of a spindle 26. A roll of paper 25 is mounted on the spindle 26 and extends to one end of the frame which may be considered the forward end, in a manner which will be more clearly explained hereinafter.

A pair of flat plate brackets 28 extend from corresponding sides of each of the guide rails 18, and these brackets have bayonet slots 30 disposed in the same general direction, as will be clearly understood from an inspection of Figure 1. The guide rails 18 have a transverse spacer bar 32 and this spacer bar carries a set screw 34 which may be adjusted to engage the telephone hand set 10 on one of the vertical sides thereof, thus insuring that the frame is held against movement in one direction, and it will be clear how the set screw 34 and the brackets 28 with the bayonet slot 30 therein may be used in attaching the frame to the screws 16 in the base of the hand set. This feature of the invention will be even more clearly understood from an inspection of Figure 2. Further attachment means for the device includes a transverse bar 36 secured to and between the said rails at the said one end of the frame, this transverse bar having a bayonet slot 38 to receive another of said screws 16.

Figure 6:
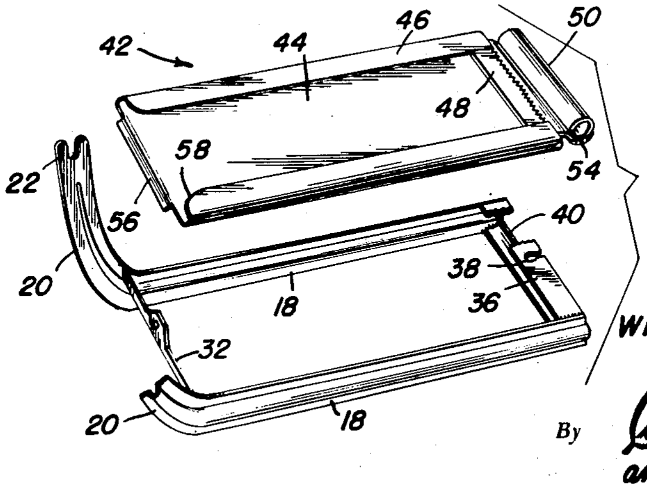
Figure 6 is a group view of the parts hereinafter referred to as the table and the frame.

The frame also includes a second transverse bar 40 at the said one end of the frame, this bar 40 being disposed beneath the bar 36 and leaving a space therebetween for the table, generally indicated by the numeral 42 and shown in perspective in Figure 6.

The table 42 includes a main writing platform or surface 44, laterally disposed channel members 46 which may be integral with the main writing surface 44, and one pair of ends of the channel members 46 are joined at their upper forward edges by a shear bar 48 having a serrated edge adapted to facilitate the tearing of the paper 25. The table also includes a hollow cylindrical member comprising a combined hand grip and holder for a writing instrument, the cylindrical member being indicated at 50 and the writing instrument being indicated at 52 in Figure 1. A pad 54 will be secured to what is normally the underside of the integral member 50 to prevent damage to a surface whereon the hand set and memo pad assembly is placed.

Figure 5:
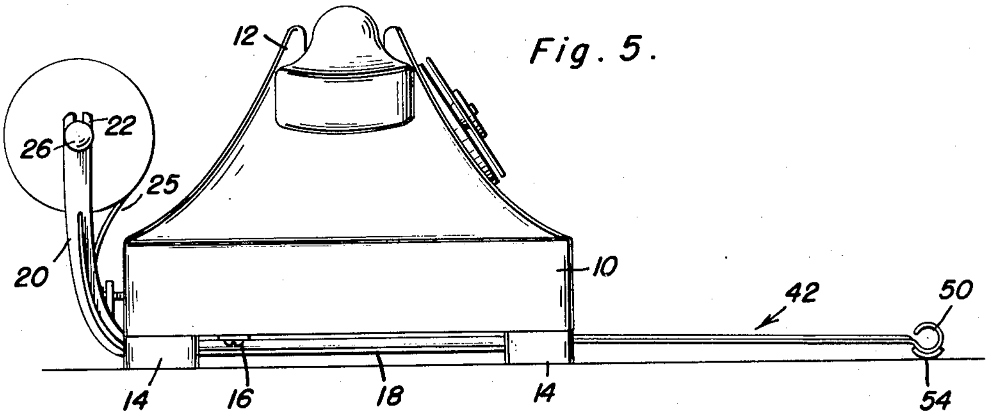
Figure 5 is a side elevational view of a hand set with this invention operatively applied thereon.

An important feature of this invention resides in the downwardly turned flange 56 at the other end of the table 42, this flange engaging the lower transverse bar 40 at the said one end of the frame when the table is fully withdrawn as to the right in Figure 5, but it should be carefully noted that the table is capable of downward pivotal movement from the position shown in the said Figure 5, so that the table may be disposed to allow writing on the paper thereon with the table held inclined to the horizontal. It is also found extremely important to note that this arrangement of elements allows the withdrawal of the table from the frame, whenever this is desired. This facilitates assembly and disassembly of the device and increases the versatility of its use.

Finally, the channel members 46 are beveled as indicated at 58 at the ends thereof disposed toward the roll of paper, this beveling facilitating the threading of the paper into the channel members 46, as when a new roll of paper is being installed in the device.

The operation of this invention will be clearly understood from a consideration of the foregoing description of the mechanical details thereof, taken in connection with the drawings and with the above recited objects of this invention. In recapitulation, it may be added that the paper is threaded completely through the table 42, that is, along the complete length of the table and between the main surface 44 thereof and the shear bar 48. Obviously, the paper will also be threaded through the frame, as when the table is withdrawn into the position indicated in Figure 5. After a portion of the paper has been used, the same may be drawn longitudinally of the device and torn off, employing the shear bar 48. The table is automatically re-loaded thereby.

Minor variations from the disclosed embodiment may be resorted to within the spirit of this invention and within the scope of the appended claims.

Having described the invention, what is claimed as new is:

1. A telephone memo pad assembly comprising a pair of parallel guide rails, confronting longitudinal grooves in the guide rails, a transverse bar connecting one pair of adjacent ends of said guide rails, upwardly extending portions on the other pair of ends of said guide rails, a transverse spacer bar connecting said other pair of ends adjacent said upwardly extending portion, a spindle rotatively mounted on and between said upwardly extending portions, a table having lateral opposed channel members slidably mounted in said grooves, a horizontal shear bar fastened to said table and spaced above the main surface of said table, whereby paper from a roll mounted on said spindle may be fed between said channel members over the main surface of said table and beneath said shear bar.

2. A telephone memo pad assembly comprising a pair of parallel guide rails, confronting longitudinal grooves in the guide rails, a transverse bar connecting one pair of adjacent ends of said guide rails, upwardly extending portions on the other pair of ends of said guide rails, a transverse spacer bar connecting said other pair of ends adjacent said upwardly extending portion, a spindle rotatively mounted on and between said upwardly extending portions, a table having lateral opposed channel members slidably mounted in said grooves, a horizontal shear bar fastened to said table and spaced above the main surface of said table, whereby paper from a roll mounted on said spindle may be fed between said channel members over the main surface of said table and beneath said shear bar, said table having a downwardly extending flange on the end of the table adjacent said roll of paper to engage said transverse bar at the outward limit of travel of the table while allowing downward pivotal movement of the table when at said limit of travel.

3. A telephone memo pad assembly comprising a pair of parallel guide rails, confronting longitudinal grooves in the guide rails, a transverse bar connecting one pair of adjacent ends of said guide rails, upwardly extending portions on the other pair of ends of said guide rails, a transverse spacer bar connecting said other pair of ends adjacent said upwardly extending portion, a spindle rotatively mounted on and between said upwardly extending portions, a table having lateral opposed channel members slidably mounted in said grooves, a horizontal shear bar fastened to said table and spaced above the main surface of said table, whereby paper from a roll mounted on said spindle may be fed between said channel members over the main surface of said table and beneath said shear bar, said table having a hollow cylinder comprising a combined hand grip and holder for a writing instrument mounted transversely on the table on the end thereof remote from said roll.

4. A memo pad assembly for mounting the base of a telephone, comprising a frame, said frame including oppositely disposed parallel side rails, said rails having confronting longitudinal grooves therein, an upwardly curved extension on each of said side rails, bearings in the end of said curved extensions, a spindle journaled in said bearings, a transverse bar connecting said side rails in proximity to said upwardly curved extensions, a pair of spaced apart, superposed transverse bars joining the ends of said side rails, said superposed bars being disposed on opposite sides of said grooves, a table, inturned edges of said table forming lateral guide channels on said table, said table being slidably received in said grooves, a shear bar secured on said inturned edges and extending across said table in spaced relation thereto, a tubular hand grip formed on the end of said table.

WILLIAM C. HAMILTON.

REFERENCES CITED

The following references are of record in the file of this patent:

UNITED STATES PATENTS

| Number | Name | Date |
|---|---|---|
| 1,390,705 | Hattersley | Sept. 13, 1921 |
| 1,419,966 | Hare | June 20, 1922 |
| 1,425,559 | Wampach et al. | Aug. 15, 1922 |
| 1,612,258 | Broadwin | Dec. 28, 1926 |